June 12, 1951  C. G. ECKERS  2,556,322
METHOD OF PRODUCING STARCH
Filed April 15, 1948
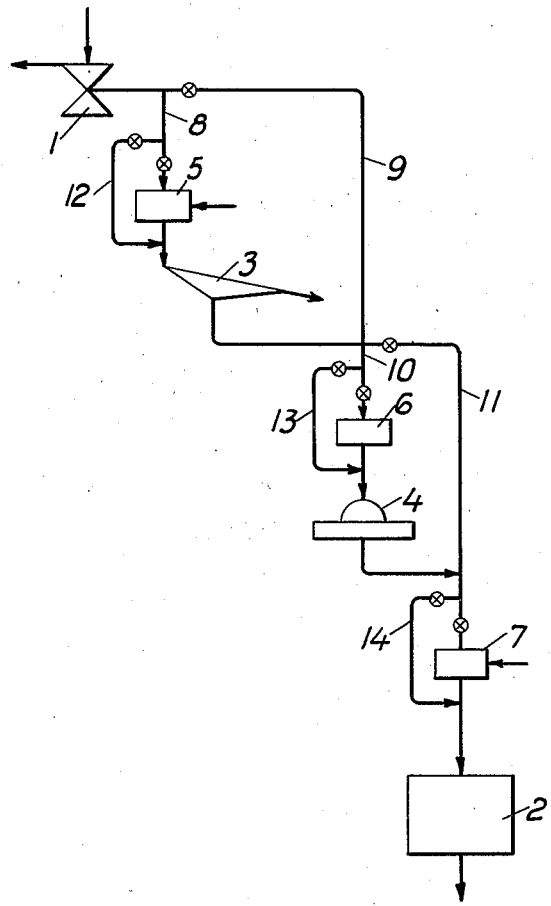
Inventor
Carl Göran Eckers
By Dowis, Hopie & Faithfull
Attorneys Patented June 12, 1951

2,556,322

UNITED STATES PATENT OFFICE 2,556,322

METHOD OF PRODUCING STARCH

Carl Göran Eckers, Stockholm, Sweden, assignor to Aktiebolaget Separator, Stockholm, Sweden, a corporation of Sweden Application April 15, 1948, Serial No. 21,267
In Sweden April 16, 1947

4 Claims. (Cl. 127—67)

In the production of starch, it is usual to grind and disintegrate the starch-containing raw material and then to strain it while adding water. In the straining, the starch-containing pulp, which consists of thick fibres and protein particles, is removed from the starch-containing milk, which, in addition to starch and liquid, also contains solid impurities, consisting mainly of finer fibres and proteins. The starch is recovered from the starch milk, as, for example, by concentrating the starch in a centrifugal separator, the concentrate then being treated in order to remove the solid impurities. The concentrate from which the solid impurities have been removed is subjected to one or more washings in order to remove the majority of the dissolved impurities as well, whereupon the purified starch is dehydrated and dried.

The present invention relates to a method for producing starch, particularly maize starch, by which a suspension of water, fibres, starch and dissolved proteins is subjected to separation in a centrifugal separator in such a way that two separated components are obtained, one of which consists of water, the majority of the proteins and part of the starch, whereas the other consists mainly of a concentrate of starch. The first component always contains some quantity of starch. It is therefore generally advantageous to subject this component to further treatment, for example, by passing it through a second centrifugal separator. This component may therefore be allowed to contain a comparatively large quantity of starch, which means that the other separated component, the starch concentrate, will be correspondingly purer. A part of the starch grains of the concentrate are, however, enclosed in or attached to impurities, such as incompletely broken cells or cell-parts, which have to be removed to obtain a satisfactory product.

The principal object of the invention is to provide an improved method for treating the starch concentrate to remove these impurities.

According to the invention, the starch concentrate from the centrifuge is subjected to mechanical treatment to at least partially liberate impurities from the starch grains. The mechanical treatment may include fine straining of the concentrate or a similar mechanical action tending to disintegrate the cell parts and protein agglomerates accompanying the starch grains, or it may include both this mechanical action and the fine straining. The above-noted mechanical treatment may be effected in disintegrators, mills, agitators, and the like. If necessary, the mechanical treatment is combined with a chemical treatment of the starch concentrate by changing its pH value in a conventional manner so that the proteins will go at least partly into solution. The starch concentrate, thus treated, is subjected to a separating operation, as by passing it to a strainer, centrifugal separator, settling vat, or table, whereby the liberated impurities are removed from the starch.

The mechanical treatment, and also the chemical treatment, can be executed simultaneously with the fine-straining or similar mechanical action, after separation of the starch concentrate to be purified. This straining is in itself a mechanical action and in some cases may therefore wholly or partly supplant the otherwise necessary mechanical action, although it cannot supplant the mechanical treatment in disintegrators, mills, agitators, and the like, as above noted. After separation of the liberated impurities, the starch is subjected to drying in the usual way.

For a better understanding of the invention, reference may be had to the accompanying drawing showing diagrammatically a plant for carrying out the method.

In the drawing, I designates a centrifugal separator in which the starch milk can be concentrated in the usual manner, and 2 designates the separator, for example, a settling vat, table, strainer, centrifuge, etc., in which the concentrate is then usually treated for removal of the solid impurities, prior to being finally subjected to dehydration or drying. Between the two apparatus I and 2 are arranged, according to the invention, a strainer 3 by means of which a fine-straining of the concentrate can be effected, and a device 4 in which the concentrate may be subjected to mechanical action to disintegrate the cell parts and protein agglomerates, and also receptacles 5, 6 and 7, for example containers provided with agitators, in which the concentrate may be subjected to a chemical treatment as previously described. The strainer 3 and the device 4, the latter of which may be a mill, disintegrator, agitator, etc., may be of any conventional type. The parts of the plant referred to are coupled to one another in such a manner that the starch concentrate from separator I may either be led to strainer 3 through pipe 8, or be conducted past the strainer 3 to the device 4 through pipes 9 and 10, and so that the finely strained concentrate obtained from strainer 3 may either be led to the device 4 through pipe 10, or be conducted past this device to the separator 2 through pipe 11. The chemical treatment in the receptacles 5, 6 and 7, or any of them, may, if desirable, be omitted by using the shunt pipes 12, 13 and 14, respectively.

In the following claims, "disintegrating" and "mechanical disintegrating action" are intended to denote mechanical treatment sufficient to break up the cell parts and protein agglomerates in the starch concentrate, for example, by a mill, disintegrator, agitator, etc., as distinguished from screening or straining, these last two actions being insufficient for this purpose.

I claim:

1. In the production of starch, particularly maize starch, in which a suspension of water, fibres, starch grains and undissolved proteins is centrifugally separated into a component comprising water and the main portion of the proteins and part of the starch, and a second component comprising a starch concentrate and some entrained impurities, the improvement which comprises subjecting the starch concentrate to a mechanical disintegrating action to at least partially disintegrate and liberate cell parts and protein agglomerates accompanying the starch grains, and subjecting the concentrate thus treated to a separating operation to remove solid impurities from the starch.

2. The improvement according to claim 1, which comprises also adjusting the pH values of said concentrate, prior to said last separating operation, to cause the proteins therein to go at least partly into solution.

3. The improvement according to claim 1, comprising also fine straining of said starch concentrate, followed by said mechanical disintegrating action.

4. In the production of starch, particularly maize starch, in which a suspension of water, fibres, starch grains and undissolved proteins is centrifugally separated into a component comprising water and the main portion of the proteins and part of the starch, and a second component comprising a starch concentrate, the improvement which comprises fine straining of the starch concentrate, disintegrating the cell parts and protein agglomerates accompanying the starch grains from said fine straining, adjusting the pH value of said starch concentrate from said centrifugal separation to cause the proteins in the concentrate to go at least partly into solution, and subjecting the concentrate thus treated to a separating operation to remove solid impurities from the starch.

CARL GÖRAN ECKERS.

REFERENCES CITED

The following references are of record in the file of this patent:

UNITED STATES PATENTS

| Number | Name | Date |
|---|---|---|
| 248,973 | Williams | Nov. 1, 1881 |
| 278,490 | Best | May 29, 1883 |
| 345,409 | Birge | July 13, 1886 |
| 406,559 | Behr | July 9, 1889 |
| 2,115,171 | Kelling | Apr. 26, 1938 |
| 2,122,084 | Brown | June 28, 1938 |
| 2,310,651 | Peltzer | Feb. 9, 1943 |
| 2,323,077 | Peltzer | June 29, 1943 |
| 2,437,036 | Maurer | Mar. 2, 1948 |